US00RE44679E

(19) United States
(12) Reissued Patent
Ruuskanen et al.

(10) Patent Number: US RE44,679 E
(45) Date of Reissued Patent: Dec. 31, 2013

(54) METHOD AND SYSTEM FOR PROCESSING TELECOMMUNICATION SIGNALS

(75) Inventors: Markku Ruuskanen, Porvoo (FI); Reijo Leppanen, Espoo (FI)

(73) Assignee: Intellectual Ventures I LLC, Wilmington, DE (US)

(21) Appl. No.: 12/108,057

(22) Filed: Apr. 23, 2008

Related U.S. Patent Documents

Reissue of:
(64) Patent No.: 7,035,205
Issued: Apr. 25, 2006
Appl. No.: 10/327,594
Filed: Dec. 23, 2002

U.S. Applications:
(63) Continuation of application No. PCT/FI01/00572, filed on Jun. 15, 2001.

(30) Foreign Application Priority Data

Jun. 26, 2000 (FI) ..... 20001517

(51) Int. Cl.
*G01R 31/08* (2006.01)

(52) U.S. Cl.
USPC ..... 370/221; 370/216; 370/286

(58) Field of Classification Search
USPC ..... 370/216–220, 221, 235–244
See application file for complete search history.

(56) References Cited

U.S. PATENT DOCUMENTS

| | | | | |
|---|---|---|---|---|
| 5,007,047 | A | 4/1991 | Sirdhar et al. | |
| 5,663,949 | A | 9/1997 | Ishibashi et al. | |
| 6,327,244 | B1 | 12/2001 | Sakamoto et al. | |
| 6,359,858 | B1 | 3/2002 | Smith et al. | |
| 6,535,479 | B1 | 3/2003 | Ikematsu | |
| 6,781,993 | B1 * | 8/2004 | Takechi et al. | 370/395.1 |
| 2002/0142811 | A1 * | 10/2002 | Gupta et al. | 455/570 |

FOREIGN PATENT DOCUMENTS

| | | | |
|---|---|---|---|
| EP | 0 884 884 | A2 | 12/1998 |
| EP | 0884884 | | 12/1998 |
| EP | 0 926 840 | A2 | 6/1999 |
| EP | 0926840 | | 6/1999 |
| WO | WO 93/09610 | | 5/1993 |
| WO | WO 93/09610 | A1 | 5/1993 |
| WO | WO 96/42142 | | 12/1996 |
| WO | WO 96/42142 | A1 | 12/1996 |

(Continued)

OTHER PUBLICATIONS

The International Search Report for PCT/FI2001/00572 mailed on Jan. 10, 2002.

The International Preliminary Examination Report for PCT/FI2001/00572 completed on May 24, 2002.

*Primary Examiner* — Phuc Tran

(57) ABSTRACT

The present invention relates to a method and a system of implementing a signal processing facility in a digital transmission system environment. In the invention, the signal between the switching field (GSW) and the interface unit ETS1 is divided into a first (DEOS, DSOE) and second signal (DGO, DSO). The first signal is directed through the signal processing unit and the second signal past it. Either one of the signals is selected and activated depending on the need of the signal processing and the operational status of the signal processing unit; this information the interface unit gets from the control unit.

27 Claims, 9 Drawing Sheets

(56) References Cited

FOREIGN PATENT DOCUMENTS

| | | |
|---|---|---|
| WO | WO 98/34353 | 8/1998 |
| WO | WO 98/34353 A1 | 8/1998 |
| WO | WO 98/48527 | 10/1998 |
| WO | WO 98/48527 A2 | 10/1998 |

* cited by examiner

METHOD AND SYSTEM FOR PROCESSING TELECOMMUNICATION SIGNALS

Matter enclosed in heavy brackets [ ] appears in the original patent but forms no part of this reissue specification; matter printed in italics indicates the additions made by reissue.

This is a request for filing a continuation application under 37 CFR 1.53(b) of pending prior international application Number PCT FI01/00572, filed on Jun. 15, 2001 entitled METHOD AND SYSTEM FOR PROCESSING TELECOMMUNICATIONS SYSTEMS which designated the United States.

*This application is a Reissue application of U.S. Ser. No. 10/327,594, filed Dec. 23, 2002, now U.S. Pat. No. 7,035,205, granted Apr. 25, 2006, which claims priority to Finland Patent Application No. 20001517, filed Jun. 26, 2000.*

BACKGROUND OF THE INVENTION

1. Field of the Invention

The present invention relates to telecommunication systems. In particular, the invention relates to a new and improved method of implementing different signal processing facilities in a digital transmission system environment.

2. Description of the Prior Art

At present, speech is being transferred in telecommunication networks generally in a digital form. The telecommunication network, especially a telephone network, consists of the terminal devices of the subscriber, telephones and digital transmission systems. One example of a digital transmission system is the DX 200 transmission system manufactured by the assignee. Its main parts and the principal structure are a subscriber interface, junction line interface, switching field, call control and operation control.

The subscriber interface is implemented by a subscriber stage which is responsible for connecting the subscriber lines to the transmission system. The junction line interface is implemented by a central terminal which comprises an interface to the transmission path and to the switching field. The switching to the switching field may be either a direct interface or an interface implemented indirectly via some other unit, such as an echo-cancelling unit.

In the digital transfer and transmission technique, a pair of wires has generally been used for the signal transmission that enables one to transfer the signal even longer distances without causing any significant crosstalk disturbance to its environment and without the signal itself being disturbed by an external energy radiation. The channel used for the through connection of a separate communication, for example a call, is transferred as multiplexed in the digital signals having a bigger transfer rate. Multiplexed signals may be transferred from one place to another using varying methods. The transmission systems handle in most of the cases bit streams with the transfer rate of 2.048 M bit/s (in the USA, Canada and Japan 1.544 Mbit/s).

When in the following section one speaks about the signal and echo of a call connection, the signal is primarily used to mean a PCM coded speech signal with the transfer rate of 64 kbit/s that is defined in the recommendation G.711. of ITU-T. In the systems with the transfer rate of 2.048 Mbit/s, which are hereinafter referred to as E1 lead or E1 interface, a PCM coding in accordance with the A-law is used, and in the systems with the transfer rate of 1.544 Mbit/s, which are hereinafter referred to as DS1 lead or DS1 interface, a PCM coding in accordance with the μ-law is used.

At present, echo erasing is needed primarily in two cases: in international telecommunication connections and mobile communication systems. The main technical reason for the fact that an echo eraser is needed is the 2/4 lead transformation, which is done in the line interface between the subscriber line and the local transmission system. Originally, the concept of "two-wire line" in the telephone technique means that both of the transmission directions of the signal proceed in the same twin wire. The "four-wire line" means that the directions have been so divided that the first direction uses the first twin wire and the second direction the second twin wire.

Since it is not reasonable or even possible to use a completely ideal impedance adaptation in the 2/4 lead transformation, for example for cost reasons, the signal leaks or "echoes" through the 2/4 lead transformation circuit to the transmission path of the other direction. In FIG. 1 this is illustrated so that in the transformation circuit $2/4W_B$ of the B-subscriber, the leakage has been marked with a curved arrow, which represents a returning signal. Because of this returning signal, the A-subscriber hears his/her own speech. This does not do any harm, if the distance between the A-subscriber-$2/4W_B$ transformation circuit is relatively short so that the delay of the speech signal is below 25 ms. In practice, the distance and the delay caused by it exceed the allowed distance and delay. This happens often with the international connections and in mobile communication systems.

In the diagrammatic representation illustrated in FIG. 2, the tasks of the echo eraser EC include erasing the echo, that is the signal which in FIG. 2 is described by a curved arrow and letter e. When the echo e has been erased, the A-subscriber does not hear it any longer. The erasing of echo is possible because the leakage caused by the 2/4 lead transformation can be measured at the beginning of the call connection and during it, in which case the call eraser EC may model the leakage and based on it erase the echo signal from the signal to be transmitted.

Since the modern transmission systems are digital, often the whole distance between the echo eraser and 2/4 lead transformation is digital. The digital signal processing technique offers excellent possibilities for the advantageous implementing of the echo eraser. FIG. 2 illustrates also the switching of the signaling path through the transmission system. Normally, if the echo eraser is not used, then $S_{s2}=S_{s1}$ and $S_{r2}=S_{r1}$. When the echo eraser is in use, then $S_{s2}=S_{s1}$ but $S_{r2}=S_{r1}-e$, in which letter e stands for echo.

FIGS. 3a–3c represent alternative ways of implementation, of how to attach the echo-cancelling unit to the existing transmission systems. In describing the ways of implementation, the redundancy of the echo erasing facility is also taken into account, which is necessary because, if the echo-cancelling unit handling the traffic of a STM-1 line is corrupted, then a remarkably big traffic capacity is lost; the capacity of a STM-1 line is approximately 2000 simultaneous call connections with the transfer rate of 64 kbit/s.

FIG. 3a represents an example in which an echo eraser is used in a pool connected to the switching field. The interface unit or the STM-1 interface unit, that is the central terminal ETS1, by which the junction lines are attached to the transmission system and which in this example has been secured by a doubling, is attached to the switching field GSW of the telephone exchange. For the echo erasing there are also the echo-cancelling units ECS1 attached to the switching field. Among the call connections to be connected to the STM-1 line, the channels of those connections that need the echo erasing are circulated via the group ECS1 POOL of the echo-cancelling unit using the switching field GSW. For the redundancy, the echo-cancelling pool may be equipped with a desired amount of redundant echo-cancelling units. The disadvantage of the solution is the extravagant use of the access links of the switching field GSW.

FIG. 3b represents an example in which the echo erasers are located in a series between the switching field and the interface unit. In this solution only a third part of the access links of the switching field are used as compared to the case as presented by FIG. 3a, if we are examining a case in which all the STM-1 lines need echo erasing. The disadvantage with this solution is the cumbersome redundancy of the echo eraser; it has to be done for each ETS1 unit separately. Consequently, if the echo-cancelling unit has been integrated for one ETS1 unit, then one has to use an expensive 1+1 redundancy.

In the implementation as shown in FIG. 3c, the interface unit ETS1 is directly connected to the switching field unit GSW. The echo-cancelling units ECS1 are located under the control of the interface units ETS1 so that the connections needing the echo erasing are connected via the echo eraser before connecting them to the switching field. The disadvantage of the solution is the implementation of redundancy, which again has to be done for each ETS1 unit separately.

The disadvantage with all the solutions of echo erasing presented above is either the extravagant use of the access links of the switching field GSW or the non-optimal and expensive implementation of echo erasing.

SUMMARY OF THE INVENTION

The present invention eliminates the drawbacks referred to above or at least significantly alleviates them. One specific objective of the invention is a new type of method which enables elimination of the problems associated with the signal processing of a digital data transmission or some other signal processing function. The invention further is a novel system for signal processing in a digital transmission system that can be implemented and assembled simply and as advantageously as possible. Furthermore, the invention is a signal processing arrangement that effectively utilizes the resources of the transmission system using them for signal processing only in a case when it is really necessary.

Although the invention is described by using echo erasing as an example in the digital transmission system of the telecommunication network, the echo erasing is, however, just one example of signal processing which enables shaping the signals to be transported in a digital telecommunication network. Examples of other shaping measures are, for example the processing of tones (adding to the traffic channel or identification in the channel) and the transformation of the speech coding law (for example from the pulse code modulation into an adaptive differential pulse code modulation). Therefore, echo erasing is described above and in detailed system implementation of the invention, it is obvious to a person skilled in the art that the invention may be generalized to any signal processing function instead of echo erasing or in addition to it.

The invention relates to a method for implementing a signal processing function, such as echo erasing or other corresponding function in a digital transmission system environment. One example of a transmission system in which the invention may be applied is the DX 200 transmission system manufactured by the assignee and the other versions derived using it as a basic system, such as DX 210 and DX 220. In the method, speech and/or data connections are established by transmitting digital speech and/or data signals between the switching field and the interface unit. These signals may be signals between two subscribers, the A-subscriber and the B-subscriber, and they may proceed even longer distances along the transmission paths between the transmission systems.

The responsibility of the switching field is to route the signals connected with the channels of call connections further in the transmission system based on the signaling information relating to the call connection. The switching field may be doubled using two identical switching field sides so that both of the sides have an access to the signal processing unit and to the interface units either on both sides with their own separate signals or using signals common to both sides.

Part of the call connections are directed to a signal processing unit, e.g. an echo-cancelling unit, in which unwanted signals are erased from them. When signal processing or echo erasing is used depends, for example, on how long the transit time delay of the signal is between the device of the subscriber and the 2/4 transformation lead.

According to the invention, the digital signal between the switching field and the interface unit is divided into a first and a second signal. The signals are connected through the signal processing unit as a first signal and past the signal processing unit as a second signal. The first signal is selected to be active, if the signal processing function is activated for the connection to be transmitted. In addition, there may be a precondition that the signal processing unit is in place and operational. Otherwise, the second signal is selected to be active, in which case the signal to be transmitted is not processed at all. This kind of situation may emerge, if the echo-cancelling unit is out of place or non-operational.

In one embodiment of the invention, the first and the second signals are connected to a selector by means of which one of the signals is selected and activated. The selector may be controlled by means of control information received from the control unit that may be based on monitoring and test transmissions performed in the transmission system that enable detection of a damaged signal processing unit. The control information may also be based on other information that has been delivered to the control unit.

The operation of a signal processing or echo-cancelling unit may be guaranteed by a signal processing or echo-cancelling unit connected to the switching field. If the actual signal processing or echo-cancelling unit is not operational, then those call connections are connected via a standby unit for use in performing signal processing, for example, because of an unwanted echo signal. One or more standby units may be connected to the switching field depending on the capacity of the signal processing, transmission system and other components. The standby signal processing unit is either identical with the first signal processing unit as concerns its structure and functional characteristics or different from it, specially designed for being in reserve.

In one embodiment of the invention, the signal is being processed in the signal processing unit in some other way than for erasing an unwanted echo. Advantageously, the signal strength may be automatically adjusted or the speech coding law of a digital signal may be changed. The combinations of the aforementioned signal processing functions are also possible.

The invention also relates to a system for implementing signal processing in a digital transmission system environment comprising a switching field, which functions in the transmission system as a unit routing call and data connections, and an interface unit which is connected to the switching field and transfer system line to function as an interface between the transfer system and transmission system. In addition, the transmission system comprises a signal processing unit which communicates with the switching field and the interface unit. In the system, connections are established by transmitting digital speech and/or data signals between the switching field and the interface unit. Certain signals are directed via the aforementioned signal processing unit in order to process digital signals.

According to the invention, the system comprises means for connecting the signals between the interface unit and the switching field through the signal processing unit as a first signal and past the signal processing unit as a second signal, and a selector which is connected to the first and second signal and which is used to select and activate the first or second signal based on predetermined inference conditions. If there is the signal processing selected for the connection to be transmitted, then the selector activates the first signal. Otherwise, the second signal is selected and activated. It may be selected and activated depending on the control of the transmission system, operation environment and the requirements set for the operation.

In one embodiment of the invention, the system comprises a standby signal processing unit which is connected to the aforementioned switching field and via which those signals are connected that are chosen to be connected via the aforementioned signal processing unit, in case the actual signal processing unit is not operational. The system may also comprise a separate control unit which controls the selector which is used to select and activate the signal to be transported through the signal processing unit or past it.

As compared to prior art, the advantage of the invention is a signal processing for signals to be transmitted that is remarkably more advantageously and reasonably implemented. Thanks to the present invention, for example the echo erasing may be implemented at quite reasonable expense in a transmission system in which even large quantities of calls and data are transmitted, while at the same offering a secured echo erasing for all the signals needed. Furthermore, a consequence of the present invention is that there is no need to build in the transmission system substantial control logic for the controlling of connections needing signal processing, because the already existing logic, that is the switching field is used. In spite of this, with the solution in accordance with the invention, the resources of the switching field are not wasted for signal processing in vain, instead their use is well considered and optimized.

BRIEF DESCRIPTION OF THE DRAWINGS

In the following section, the invention will be described in detail by the aid of a few examples of its embodiments, in which FIG. 1 schematically represents a transmission path of a call connection.

DETAILED DESCRIPTION OF THE INVENTION

Although in the following examples the invention will be described by referring to echo erasing, it is obvious to a person skilled in the art that echo erasing is comparable to even more general signal processing. Therefore, the invention is not restricted merely to echo erasing and to the methods of signal processing used in it, instead the invention may be utilized in a corresponding way in implementing also other signal processing functions for connections to be transmitted.

In the following there is described the background information which is essential when describing the different applications of the invention. The DX 200 system mentioned above comprises a STM-1 interface (STM, Synchronous Transport Module), which is based on the SDH transfer technique (SDH, Synchronous digital hierarchy). The STM-1 interface has been defined in the recommendations of the G series of ITU-T (e.g. G.707 and G.783). Inside of one STM-1 signal, 63 pieces of signals with the transfer rate of 2.048 Mbit/s are transported (so-called E1 signals), and the bit rate of the STM-1 signal is 155.520 Mbit/s. The STM-1 signal is generated in the DX 200 system using a central terminal, which is called ETS1. The signal is transported from the switching field of the DX 200 system into this ETS1 interface block. The DX 200 system traditionally uses lines with the transfer rate of 4.096 Mbit/s as the internal data links in each of which two E1 signals are transported. For example, the access lines of the switching field have been of the transfer rate of 4.096 Mbit/s. This would be possible also in the case of STM-1. Since one has changed over to a new switching field GSW, in which the transfer rates of the junction lines are 184 Mbit/s, also the E1 signals are transferred from the multiplexing unit of the switching field (SWMUX) to the central terminal ETS1 at a higher rate, which is 16.384 Mbit/s. Consequently, the signal takes the route the core of the switching field GSW<->184 Mbit/s<->multiplexing unit SWMUX<->16.384 Mbit/s<->central unit ETS1<->STM-1 line interface.

Since on the other hand these series buses are faster than the 4.096 Mbit/s and since also the level of integration of electronic components has increased, one has decided to implement the echo erasing as a unit of bigger capacity.

The system described above will be hereinafter referred to as DX200-STM1 and its echo eraser as ECS1.

In a previous system, which is hereinafter referred to as DX200-E1, in which the interfaces of the switching field GSW2K have the transfer rate of 4.096 Mbit/s, the echo erasing has been implemented by connecting the unit performing the echo erasing in a series with the central terminal, which corresponds to the case of FIG. 3b. It has not been considered necessary to secure the echo-cancelling unit, since its capacity has been only 4.093 Mbit/s, corresponding to two E1 lines, i.e. approximately 60 simultaneous call connections.

Figure 1:
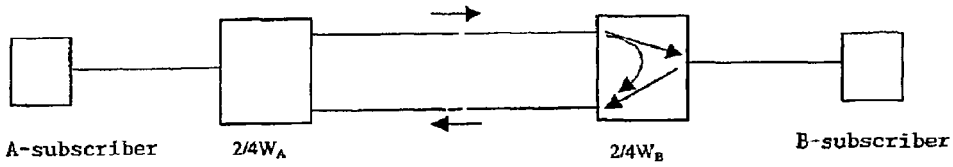
Figure 2:
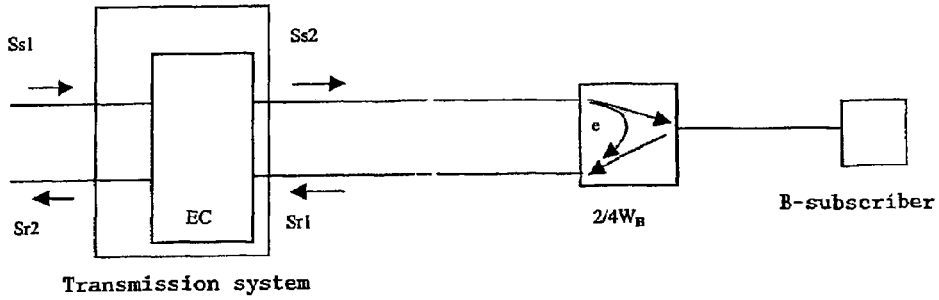
FIG. 2 represents the wiring of FIG. 1 and the proceeding of the signal in more detail, taking into account also the transmission system.
Figure 3A:
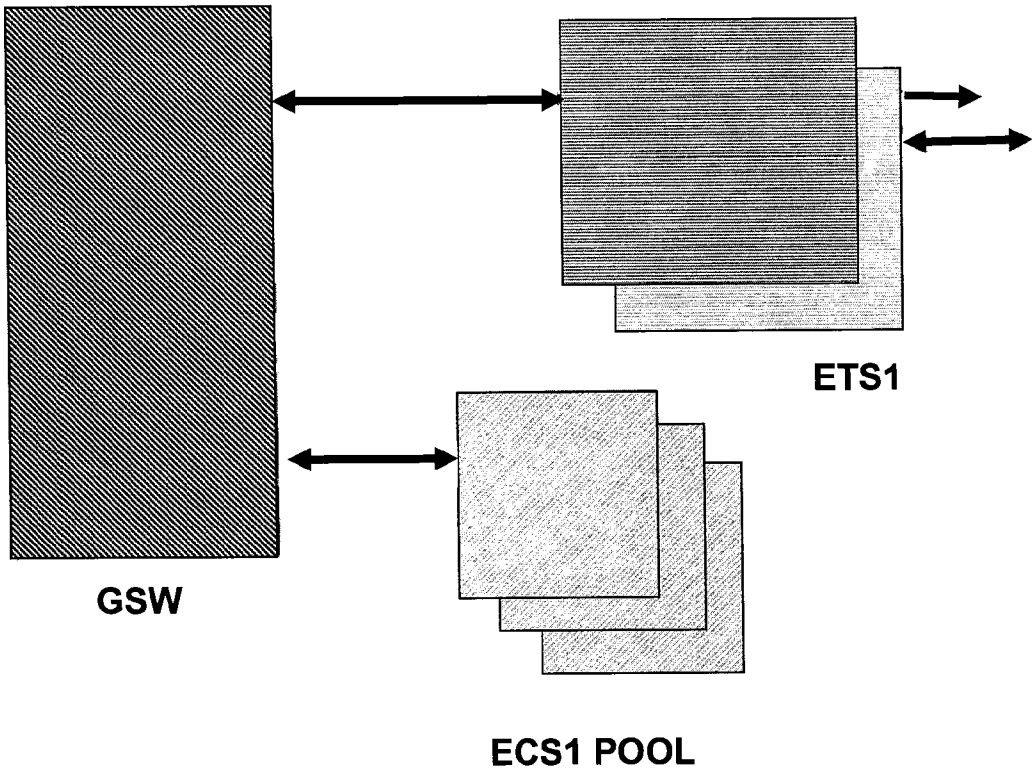
FIGS. 3a–3c represent known echo erasing arrangements.

The alternative as shown in FIG. 3a as applied to the DX200-STM1 system would mean a structure in which the echo-cancelling unit is attached to its environment by lines of 16.384 Mbit/s, of which there are 2×2×8 pcs=32 pcs (8×16.384 Mbit/s=131.072 Mbit/s); 8 lines are enough to transfer 63 E1 signals between the switching field and the echo cancelling unit into one direction, and another 8 lines into the other direction. The echo eraser is in a pool in the switching field.

Figure 3B:
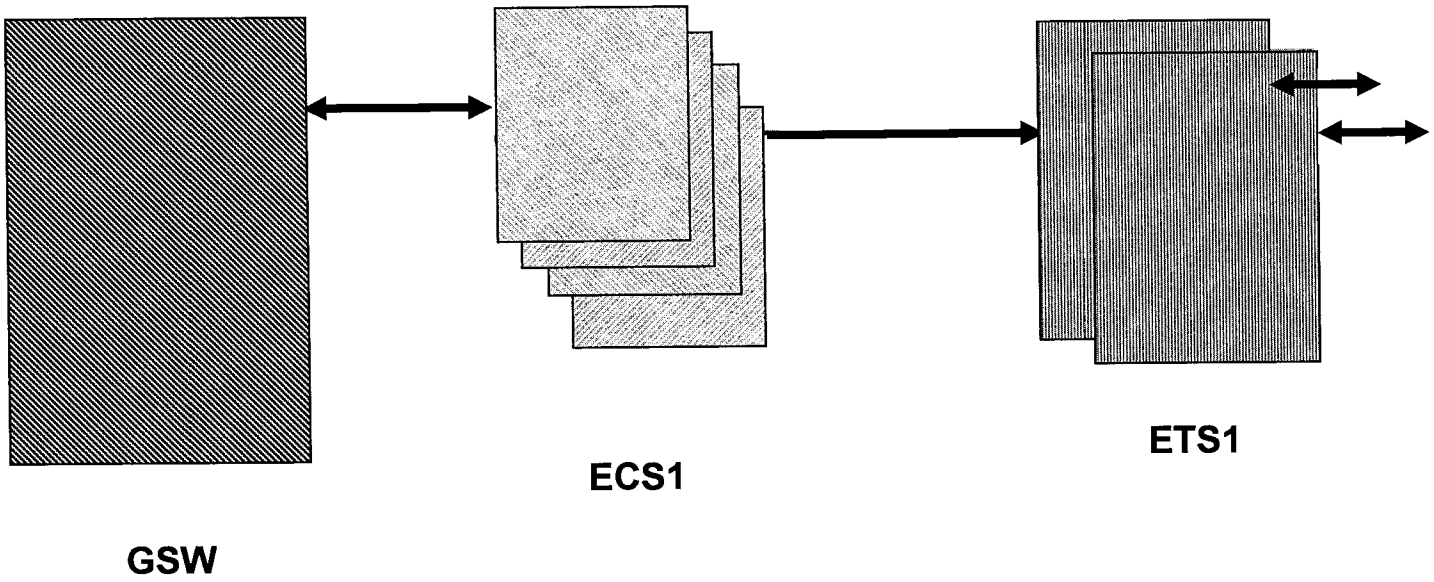
Figure 3C:
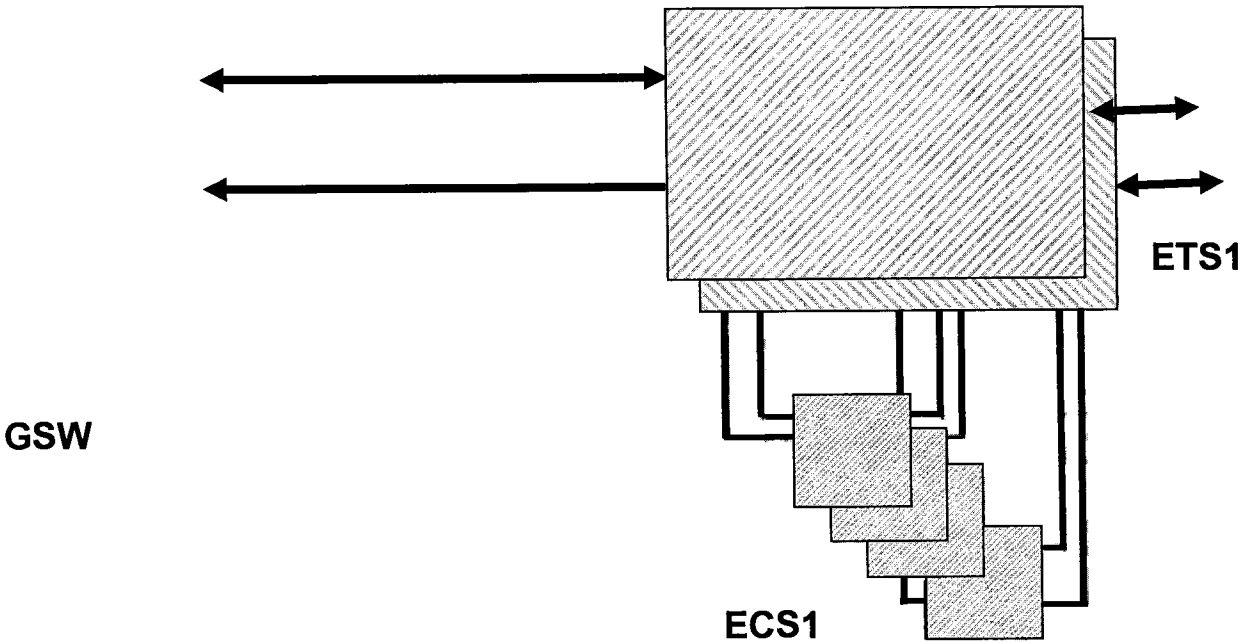

In the alternative as shown in FIG. 3b, the interfaces of the echo eraser are of the same rate, 16.384 Mbit/s, but the echo-cancelling unit is attached to the switching field on the one side and to the central terminal ETS1 on the other. In this solution, only one third of the switching field interfaces are used as compared to the first alternative, if we assume that all the call connections need echo erasing.

For securing the echo-cancelling unit, two main principles may be presented: 1+1 redundancy, that is each ECS1 has its own redundant unit and n+1 redundancy, that is for the group ECS1 of the echo-cancelling unit of n pieces there is 1 piece of redundant echo-cancelling units.

Figure 4:
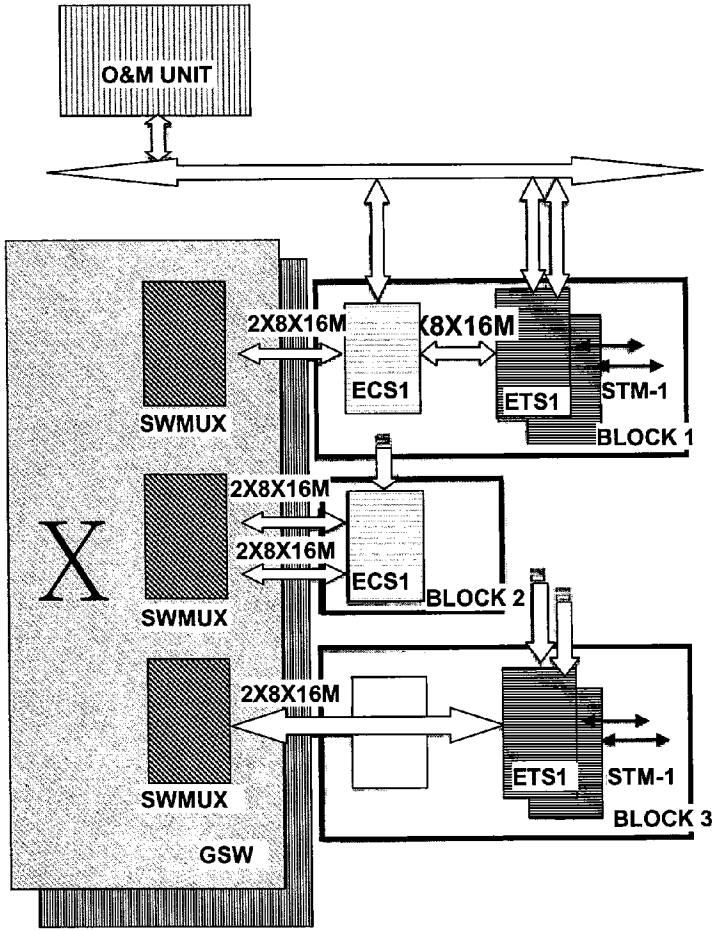
FIG. 4 represents general features of one implementation of the invention.

In the invention for the implementation of the DX200-STM1 system there has been described a system in which a pool structure as described in the first alternative above (FIG. 3a) functions in a failure situation, if the echo-cancelling unit is defective or out of use for some other reason, and the structure as described in the second alternative (FIG. 3b) is in use in a normal situation. The general features of this implementation have been presented in FIG. 4. In FIG. 4, the switching field GSW has been so drawn that its interfaces are 16.384 Mbit/s lines; that is the multiplexing unit SWMUX is an internal unit of the switching field GSW. The echo-cancelling unit ECS1 is attached to the switching field unit as well as to the central terminal ETS1 on the other side.

The O&M unit to be used for the management of operation and maintenance controls the operation of the echo-cancelling units ECS1 and the central terminals ETS1 using, for example the Ethernet interface. The echo-cancelling unit ECS$\mathbf{1}_p$ in block 1 of FIG. 4 is an echo-cancelling unit which performs normal echo erasing operations. The ECS$\mathbf{1}_r$ in block 2 is a redundant echo-cancelling unit which may take the charge of the traffic normally going through the ECS$\mathbf{1}_p$ that is defective or out of use for some other reason. The ECS$\mathbf{1}_r$ may be a unit completely identical with the ECS$\mathbf{1}_p$ as concerns its hardware and software, only its way of attachment to the rest of the transmission system determines that it functions as a redundant unit.

If there is no need for echo erasing in a certain STM-1 line, the echo-cancelling device ECS1 will not be installed at all. This situation is described by block 3 of FIG. 4. In that case, the signals may proceed directly between the switching field GSW and the central terminal ETS1. This is achieved in such a way that the control unit of the system manages all the settings connected with the use of all STM-1 lines, and if there is no need for echo erasing in a certain STM-1 line, the control unit transmits this piece of information to the corresponding ETS1 units in the same way as it transmits a notification of the fact that some echo-cancelling unit is out of place or not operational; in that case the aforementioned second signal bypassing the echo-cancelling unit is selected and activated.

In FIG. 4 there has been drawn the switching field GSW and also the central terminal units ETS1 as doubled. However, in order that the clarity of the figure would not suffer, the signal buses have been drawn as simple: the buses connected with the redundant half of the GSW and the redundant ETS1 have not been drawn.

The 16.384 Mbit/s signals are in the buses that in FIG. 4 have been marked as "2×8×16M". This means that there are in the bus 2×8 pieces of 16 Mbit/s signals, eight pieces for each transmission direction.

The switching of the traffic channel in FIG. 4 through the transmission system may happen, for example along the following route: STM-1 line<->Block 3<->switching field GSW<->Block 1<->STM-1 line. In this case, at one end of the connection there is echo erasing and at the other one no cancellation. The other possibilities are: STM-1 line<->Block 3<->switching field GSW<->Block 3<->STM-1 line, in which case there is no echo erasing, STM-1 line<->Block 1<->GSW<->Block 1<->STM-1 line, in which case there is echo erasing at both ends, and STM-1 line<->Block 3<->switching field GSW<->Block 2<->switching field GSW<->Block 1, echo-cancelling unit ECS1 bypassed<->STM-1 line. In the last case it is a question about a failure situation of the echo-cancelling unit ECS1.

So that FIG. 4 would be clear there are no synchronization signals of the signals of the buses drawn in them, nor is the control signal of the changing over to the other side needed in the redundancy of the switching field GSW. The signals to be used for the mutual communication of the two central terminal units ETS1 securing one another have not been drawn either. These have, however, no essential influence on the invention and are obvious to a person skilled in the art.

Figure 5:
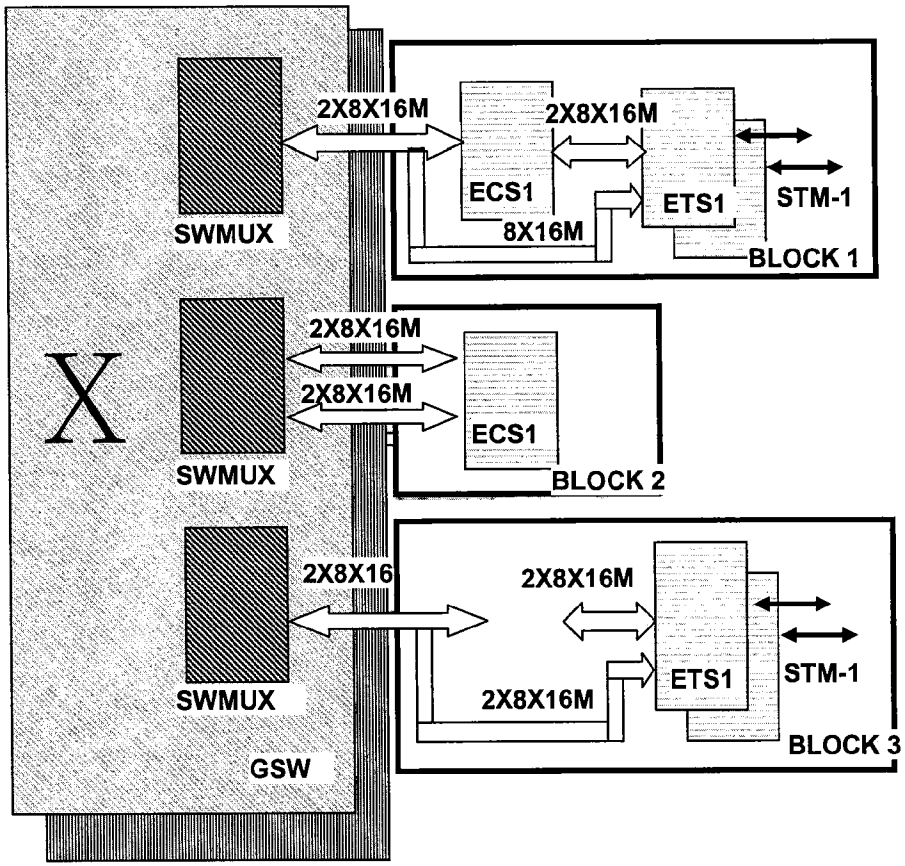
FIG. 5 represents the implementation of FIG. 4 in more detail.

FIG. 5 represents the solution of FIG. 4 as specified. The O&M interfaces have not been included in the figure, but the principle of the signal buses between the switching field GSW, echo-cancelling unit ECS1 and central terminal ETS1 have been presented in it. In block 1, the series buses coming from the switching field GSW, that have been marked as "2×8×16M", branch both in the echo-cancelling unit ECS1 and in the central terminal ETS1. It can bee seen from block 3 that the bus bypassing the echo-cancelling unit ECS1 transmits the traffic channels through in such a case when the echo-cancelling unit ECS1 is not in use: Thus, FIG. 5 implements the signal connections presented in FIG. 4: in block 1, the proceeding of the signal is as follows: GSW<->ECS$\mathbf{1}_p$<->ETS1 (since ECS1 in use), and in block 3 GSW<->ETS1 (since ECS1 not in use).

Figure 6:
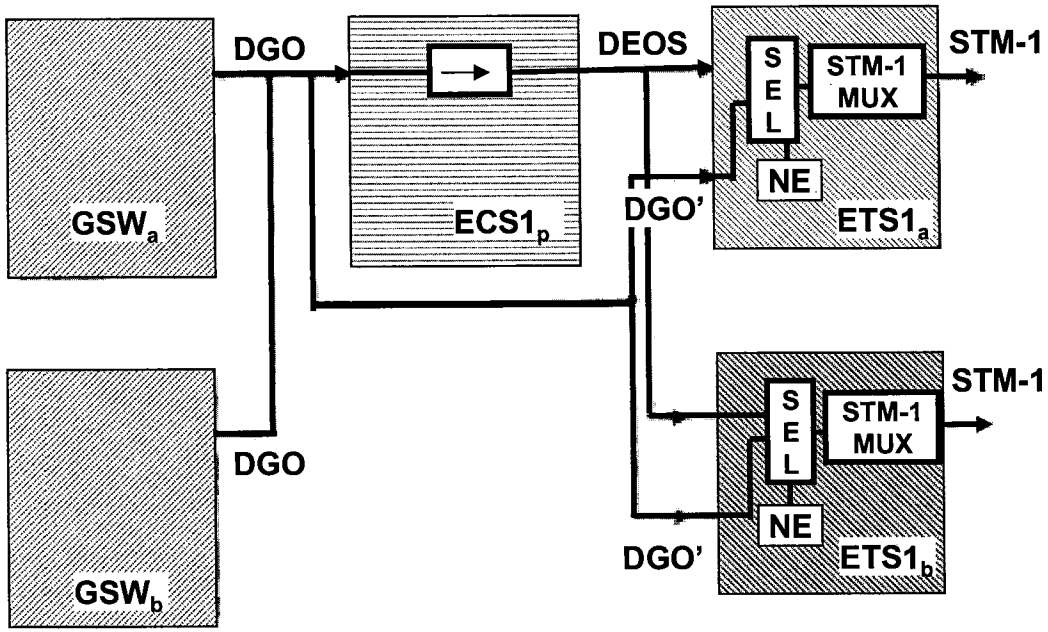
FIG. 6 represents the switching of call signals in a first direction in one system in accordance with the invention.
Figure 7:
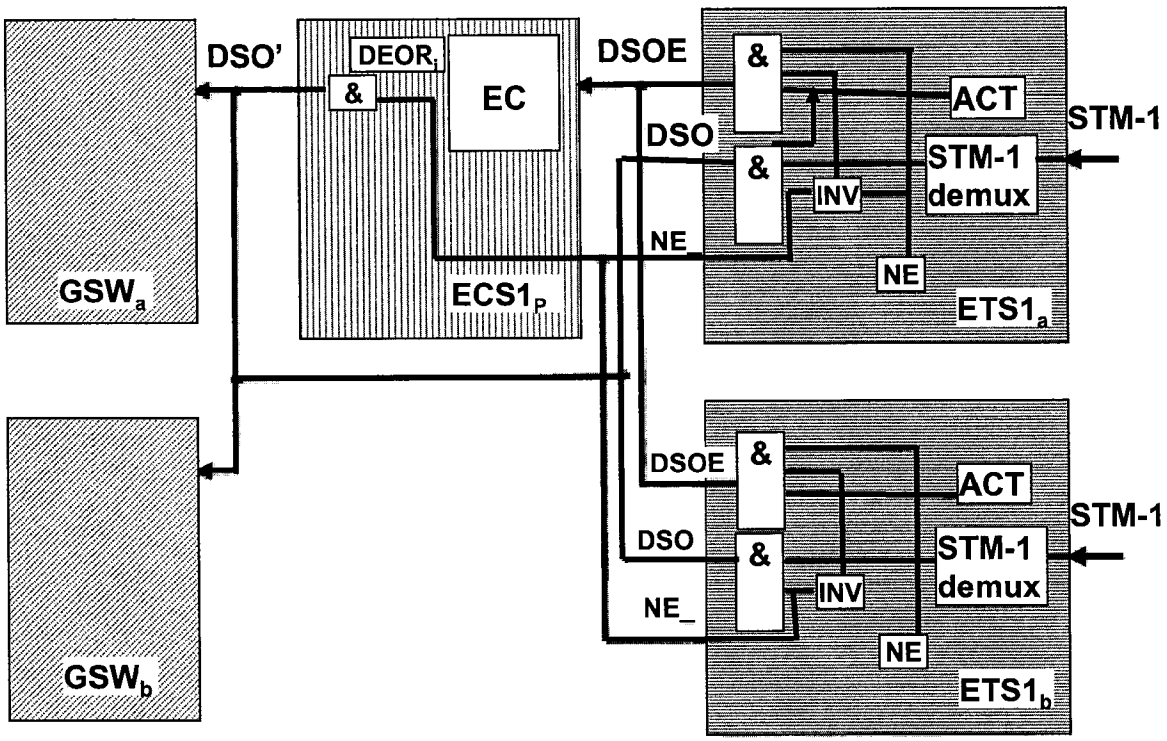
FIG. 7 represents the switching of call signals in a second direction in one system in accordance with the invention.

FIGS. 6 and 7 represent the switching of the lines transporting speech signals in a DX200-STM1 system. For the sake of clarity there is only one of the 16.384 Mbit/s lines drawn in the figures without illustrating all the eight lines. There are drawn in the figures the 16.384 Mbit/s data signals as well as the control signals which are significant with regard to the invention. For the sake of clarity let it be noted that the signals are herein referred to as the data signal, which describes solely the form of the signal; the information content to be transmitted is in the case of a speech connection, however, digitally coded speech. There is no synchronization signal connected with the 16.384 Mbit/s signals drawn in the figures, nor is the control signal connected with the switching over to the other side of the switching field GSW. $GSW_a$ and $GSW_b$ are two sides of the switching field securing one another and they are identical in operation. The central terminals ETS$\mathbf{1}_a$ and ETS$\mathbf{1}_b$ are for their part two ETS1 units that are identical as comes to their operation and secure one another. If there is no redundancy, the system comprises only one ETS$\mathbf{1}_a$ unit. The switching over to the other side of the central terminal ETS1 is independent of the switching over of the switching field GSW.

FIG. 6 represents the wiring of the signals in the first direction from the switching field towards the STM-1 interface. The DGO signals coming from the switching field GSW, that is the 16.384 Mbit/s lines are so coupled that the signal DGO of the switching field half $GSW_a$ is coupled with the DGO signal of the switching field half $GSW_b$. This is done because a doubled switching field GSW is used. The signal DGO proceeds both to the echo-cancelling unit ECS1 and to the central terminal unit ETS1; in the input interface of the latter, the signal is marked with DGO'. The ETS1 unit is aware whether the ECS1 unit is in place and operational: this piece of information it obtains from the control channel (for example the Ethernet). Every time the situation changes there is always a message informing of the change via the control channel. This piece of information is described by the signal "NE" in FIG. 6. If the echo-cancelling unit ECS1 is in place and operational, it performs its echo erasing tasks. In this transfer direction it writes in the DEOS signal data which is a copy of the DGO, in case the echo erasing is not performing any specific signal shaping in this direction.

If the echo-cancelling unit ECS1 is in place and operational, The "NE" signal controls the selector SEL in such a way that the central terminal unit ETS1 reads the DEOS signal. If the echo-cancelling unit ECS1 is not in place and operational, "NE" controls the selector SEL so that signal DGO' is being read. A read signal proceeds further to block STM-1-MUX, in which the 16.384 Mbit/s signal is first divided into eight pieces of E1 signals or capacities corresponding to them, and then 63 pieces of E1 signals are multiplexed into a STM-1 signal.

Both the DEOS signal and the DGO' signal are coming to both central terminals ETS$\mathbf{1}_a$ and ETS$\mathbf{1}_b$. In this way, both the actual and the redundant ETS1 unit are able to send significant signal containing correct data all the time in the transmission direction of the STM-1 line.

FIG. 7 represents the direction from the STM-1 line towards the switching field GSW. The STM-1-signal that is coming is at first demultiplexed into 63 E1 signals, and then eight or seven E1 signals are multiplexed into 16.384 Mbit/s signals.

The parallel central terminal units ETS1 have a common 16.384 Mbit/s DSOE signal to the echo-cancelling unit ECS1 as well as a common 16.384 Mbit/s DSO signal which bypasses the ECS1; this signal is marked in the input interface of the GSW with DSO'. In order that only one central terminal unit ETS1 may write in these signals at a time, the central terminal unit needs to know which one of the central terminals ETS1 functions as an actual, that is active unit and it also needs to know whether the echo-cancelling unit ECS1 is in use or not. This information the central terminal unit ETS1 receives via the control channel in the form of messages; the former piece of information has been marked in FIG. 7 with signal "ACT" and the latter one with signal "NE". The logic functions drawn inside ETS1 show on which conditions ETS1 is allowed to write in the DSOE and DSO signals. The & sign refers to a logic AND operation.

In case the echo-cancelling unit ECS1 is installed, it performs the echo erasing function, that is the data coming from the central terminal unit ETS1 is being modified in the "EC" block, after which the modified data DEOR$_t$ is written in the 16.384 Mbit/s DSO' signal being on the side of the switching field GSW that proceeds physically in the same line as the output signal DSO of the central terminal ETS1. The central terminal ETS1 has the possibility of force-leading the echo-cancelling unit ECS1 into a passive state using a "NE_" signal which in the 0 state prevents the echo-cancelling unit ECS1 from writing data. The "NE" signal is of the type open collector, which enables the fact that either one ETS$\mathbf{1}_a$ or ETS$\mathbf{1}_b$ or both of them may prevent the echo-cancelling unit ECS1 from writing data in the DSO' signal.

The data appearing in the 16.384 Mbit/s signal between the echo-cancelling unit ECS1 and the switching field unit GSW that is read into the switching field as a signal DSO', may therefore originate from the echo-cancelling unit ECS1 or from the central terminal ETS1. Both halves of the switching field GSW read the data and transport it through their own SWMUX units to the core of the switching field GSW.

The echo erasing may alternatively be implemented in the opposite transfer direction, in which case inside the echo-cancelling unit ECS1 of FIG. 6 there is an EC block performing the echo erasing, and inside the echo-cancelling unit ECS1 of FIG. 7 there is an arrow. A third possibility is that the echo erasing has been implemented in both directions, in which case inside the echo-cancelling unit ECS1 of both FIG. 6 and FIG. 7 there is an EC block performing echo erasing.

In addition to the echo erasing or instead of it a system built in this way may implement also other functions connected with the traffic channel or its processing, such as an automatic adjustment of signal strength or transformation of the speech code law.

Figure 8:
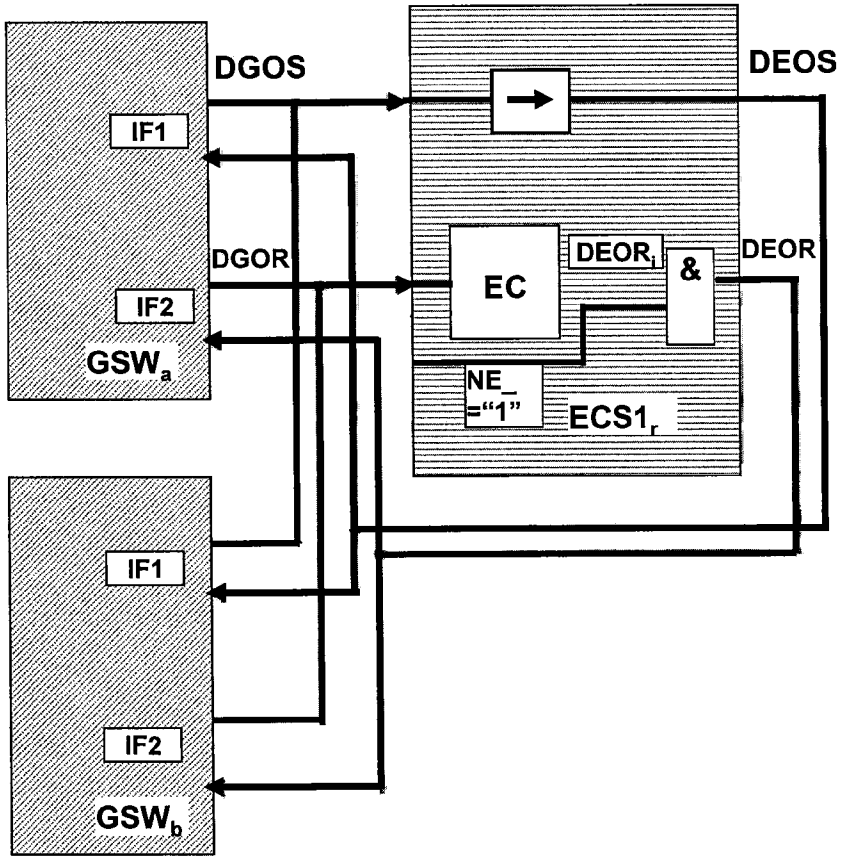
FIG. 8 represents one switching in accordance with the invention for attaching the standby echo-cancelling unit to one system in accordance with the invention.

The attachment of the redundant echo-cancelling unit ECS$\mathbf{1}_r$ to the system has been presented in FIG. 8. The signal DGOS is a 16.384 Mbit/s signal sent by the first interface IF1 of the switching field GSW that enters the block of the echo-cancelling unit ECS1 marked with an arrow that switches the signal as such into a signal DEOS, which proceeds further to the interface IF2 of the switching field. In the second direction there is the signal DGOR sent by the second interface IF2 of the switching field that enters the EC block of the echo-cancelling unit ECS1 in which the echo is erased from it, and the signal is switched further into a DEOR signal which proceeds to the first interface IF1 of the switching field. The signal "NE_" is in a logical "1" state, in which case the data DEOR$_t$ may normally access the DEOR signal through the gate AND.

The system described above and its inventive step can also be applied to a case in which instead of a STM-1 line, for example an E1-, DS1-, STM-0-, SONET STS-3- or STS-1 interface may be used as the transfer interface. In the case of interfaces of smaller rates (E1, T1, STM-0 and STS-1), there is in the system instead of ETS1 a block in which there are n pieces of interfaces of smaller rates, for example 63 pieces of E1 interfaces.

The invention also covers a case in which the rate of the interfaces of the echo cancelling and central terminal units ECS1 and ETS1 is other than the 16.384 Mbit/s; even such a case in which eight separate 16.384 Mbit/s bus signals are substituted with a signal of the category 184 Mbit/s as comes to its transfer rate.

When using a structure little more complicated, different transfer directions may be included in the same signal, in which case it is possible to implement a structure in which there are eight pieces of 32.768 Mbit/s duplex signals or a structure in which there is one piece of signal of the transfer rate of 368 Mbit/s.

Further the invention covers a case in which the data rate handled by one echo-cancelling unit ECS1 is any other than the data rate corresponding to the capacity of STM-1. The echo-cancelling unit ECS1 may handle, for example one E1 line as concerns its capacity, or even 252 E1 lines, in which 252 E1 lines correspond to the capacity of one STM-4 line.

In the detailed description of one implementation of the invention it was presented that in the case of a double switching field, the outgoing and incoming signals from the halves of the switching field to the echo-cancelling unit and towards the interface units are so connected that the halves of the switching field have common signals. Also such an alternative that both of the halves of the switching field have separate signals is included in the scope of this invention.

The invention is not restricted merely to examples of its embodiments referred to above, instead many variations are possible within the scope of the inventive idea.

The invention claimed is:

1. A method for implementing signal processing in a digital transmission system comprising:

establishing call and data connections between a switching field and at least one interface unit;

transferring a digital signal between the switching field and the at least one interface unit along first and second parallel signal paths with the first path containing a signal processing unit; and selecting the first path to provide the digital signal to the signal processing unit for processing thereof and providing a processed first signal to the at least one interface unit when the first path is selected to be active and selecting the second path to provide the digital signal to the at least one interface unit without processing by the signal processing unit when the first path is not selected to be active;

wherein the signal processing unit erases an unwanted echo signal present in the call and data connections so that signal strength on the call and data [communications] *connections* is adjusted or a code law of signals present in the call and data connections is transformed.

2. The method according to claim 1, wherein if the signal processing unit is not operational, the call and data connections are connected through a standby unit containing another signal processing function which processes the digital signal and transmits the processed signal to the at least one interface unit.

3. The method according to claim 2, wherein the parallel paths transmitting the digital signal are connected to a selector which selects and activates either the first or the second path for coupling to the at least one interface unit.

4. The method according to claim 3, wherein the selector is controlled by the control information received from a control unit.

5. The method according to claim 3, wherein the signal processing unit is secured by a redundant signal processing unit in a standby unit coupled to a switching field.

6. The method according to claim 2, wherein the signal processing unit is secured by a redundant signal processing unit in a standby unit coupled to a switching field.

7. The method according to claim 1, wherein the parallel paths transmitting the digital signal are connected to a selector which is used to select and activate either the first or the second path for coupling to the at least one interface unit.

8. The method according to claim 7, wherein the selector is controlled by the control information received from a control unit.

9. The method according to claim 8, wherein the signal processing unit is secured by a redundant signal processing unit in a standby unit coupled to a switching field.

10. The method according to claim 7, wherein the signal processing unit is secured by a redundant signal processing unit in a standby unit coupled to a switching field.

11. The method according to claim 1, wherein the signal processing unit is secured by a redundant signal processing unit in a standby unit coupled to a switching field.

12. A system for implementing signal processing comprising:

a switching field;

at least one interface unit coupled to the switching field by first and second parallel signal paths, the first and second parallel signal paths, transmitting a digital signal;

call and data connections between the switching field and the at least one interface unit;

a signal processing unit contained in the first parallel signal path, the signal processing unit configured to erase an unwanted echo signal present in the call and data connections so that signal strength on the call and data connections is adjusted or a code law of signals present in the call and data connections is transformed; and a selector coupled to the first and second parallel signal paths for selecting the first path to provide the digital signal to the signal processing unit for processing thereof and the signal processing unit providing a processed first signal to the at least one interface unit when the first parallel signal path is selected by the selector to be active and selecting the second path to provide the digital signal to the at least one interface unit without processing by the signal processing unit when the first parallel signal path is not selected by the selector to be active.

13. A system according to claim 12, comprising:

means for switching the first and second signal paths between the at least one interface unit and the switching field.

14. A system according to claim 13, wherein:

the first and second signal paths are connected to the selector to select and activate either the first or second signal paths.

15. A system according to claim 14, comprising:

a control unit coupled to the selector which provides a control signal to the selector to activate selection of the first or the second signal path.

16. A system according to claim 13, comprising:

a control unit coupled to the selector which provides a control signal to the selector to activate selection of the first or the second signal path.

17. A system acceding according to claim 12, comprising:

another signal processing unit which is redundant to the signal processing unit and means for connecting the another signal processing unit to the switching field to provide processing of the digital signal and coupling of the processed signal to the switching field.

18. A system according to claim 17, wherein:

the first and second signal paths are connected to the selector to select and activate either the first or second signal paths.

19. A system according to claim 18, comprising:

a control unit coupled to the selector which provides a control signal to the selector to activate selection of the first or the second signal path.

20. A system according to claim 17, comprising:

a control unit coupled to the selector which provides a control signal to the selector to activate selection of the first or the second signal path.

21. A system according to claim 12, wherein:

the first and second signal paths are connected to the selector to select and activate either the first or second signal paths.

22. A system according to claim 21, comprising:

a control unit coupled to the selector which provides a control signal to the selector to activate selection of the first or the second signal path.

23. A system according to claim 12, comprising:

a control unit coupled to the selector which provides a control signal to the selector to activate selection of the first or the second signal path.

*24. A device comprising:*

*a communication interface, the communication interface configured to interface with a first path and route a first signal on the first path to attenuate an echo signal present such that signal strength is adjusted or a code law of signals present is transformed, the communication interface further configured to interface with a second path and route a second signal on the second path directly to an interface unit, and wherein the communication interface is further configured to interface with*

*the first or the second path such that the signal strength is further adjusted or the code law of signals present is further transformed in addition to that caused by the attenuation of the echo signal;*

*wherein the first path and the second path are parallel signaling paths.*

*25. A device comprising:*

*a communication interface, the communication interface configured to interface with a first path and, if a first signal is received on the first path, the first signal having had an echo signal present attenuated such that signal strength is adjusted or a code law of signals present is transformed, and wherein the signal strength has been further adjusted or the code law of signals present further transformed in addition to that caused by the attenuation of the echo signal, the communication interface further configured to interface with a second path and, if a second signal is received on the second path, the second signal being received directly from the at least one switching field,*

*wherein the first path and the second path are parallel signaling paths.*

*26. A method comprising:*

*interfacing, by a communication interface unit, with a first path and a second path, wherein the first path and the second path are parallel signal paths;*

*routing, by the communication interface unit, a first signal on the first path to attenuate an echo signal present such that signal strength is adjusted or a code law of signals present is transformed;*

*routing, by the communication interface unit, a second signal on the second path directly to an interface unit; and*

*routing, by the communication interface unit, either the first or the second signal to further adjust the signal strength or to further transform the code law of signals present in addition to that caused by the attenuation of the echo signal.*

*27. A method comprising:*

*interfacing, by a communication interface unit, with a first path and a second path, wherein the first path and the second path are parallel signal paths;*

*if a first signal is received on the first path, determining, by the communication interface unit, that the first signal had an echo signal present attenuated such that signal strength is adjusted or a code law of signals present is transformed, and that the signal strength has been further adjusted or the code law of signals present further transformed in addition to that caused by the attenuation of the echo signal; and*

*if a second signal is received on the second path, determining, by the communication interface unit, that the second signal is received directly from the at least one switching field.*

* * * * *